US010107195B2

(12) United States Patent
Bolduc et al.

(10) Patent No.: US 10,107,195 B2
(45) Date of Patent: Oct. 23, 2018

(54) COMPOUND CYCLE ENGINE

(71) Applicant: Pratt & Whitney Canada Corp., Longueuil (CA)

(72) Inventors: Sebastien Bolduc, Longueuil (CA); Mike Fontaine, Boucherville (CA); Luc Landry, Longueuil (CA); Jean Thomassin, Ste-Julie (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 466 days.

(21) Appl. No.: 14/740,878

(22) Filed: Jun. 16, 2015

(65) Prior Publication Data

US 2015/0275756 A1    Oct. 1, 2015

Related U.S. Application Data

(63) Continuation-in-part of application No. 13/554,564, filed on Jul. 20, 2012, now Pat. No. 9,194,232.

(51) Int. Cl.
*F02C 6/12* (2006.01)
*F01C 1/22* (2006.01)
(Continued)

(52) U.S. Cl.
CPC .......... *F02C 6/12* (2013.01); *F01C 1/22* (2013.01); *F01C 11/002* (2013.01);
(Continued)

(58) Field of Classification Search
CPC ....... F01C 11/00; F01C 11/002; F01C 11/004; F01C 11/006; F01C 11/008; F01C 1/22; F02B 37/00
See application file for complete search history.

(56) References Cited

U.S. PATENT DOCUMENTS 2,173,595 A    9/1939  Schutte
2,748,564 A *  6/1956  Marchal ............... F02C 5/11
                                             60/248
(Continued)

FOREIGN PATENT DOCUMENTS

CA    2516720    9/2004
CA    2821497    1/2014
(Continued)

OTHER PUBLICATIONS

Short Article by Paul Lamar published on the News Letter Mar. 4, 2006, http://www.rotaryeng.net/why-tc.txt.
(Continued)

*Primary Examiner* — Jason Shanske
*Assistant Examiner* — Jessica Kebea
(74) *Attorney, Agent, or Firm* — Norton Rose Fulbright Canada LLP

(57) ABSTRACT

A compound cycle engine having an output shaft; at least two rotary units each defining an internal combustion engine, a first stage turbine, and a turbocharger is discussed. The first stage turbine includes a rotor in driving engagement with the output shaft between two of the rotary units. The exhaust port of each rotary unit is in fluid communication with the flowpath of the first stage turbine upstream of its rotor. The outlet of the compressor of the turbocharger is in fluid communication with the inlet port of each rotary unit. The inlet of the second stage turbine of the turbocharger is in fluid communication with the flowpath of the first stage turbine downstream of its rotor. The first stage turbine has a lower reaction ratio than that of the second stage turbine. A method of compounding at least two rotary engines is also discussed.

22 Claims, 8 Drawing Sheets

(51) Int. Cl.
*F01C 11/00* (2006.01)
*F02B 37/00* (2006.01)

(52) U.S. Cl.
CPC ............ *F01C 11/008* (2013.01); *F02B 37/00* (2013.01); *F04C 2240/30* (2013.01)

(56) References Cited

U.S. PATENT DOCUMENTS

| | | | |
|---|---|---|---|
| 3,672,160 | A | 6/1972 | Kim |
| 3,918,413 | A | 11/1975 | Eiermann |
| 3,993,029 | A | 11/1976 | Eiermann |
| 4,135,485 | A | 1/1979 | Loyd, Jr. |
| 4,221,192 | A | 9/1980 | Badgley |
| 4,435,121 | A | 3/1984 | Wosika |
| 4,742,683 | A | 5/1988 | Heminghous et al. |
| 4,809,498 | A * | 3/1989 | Giffin, III ............... B64C 11/48 416/129 |
| 4,815,282 | A | 3/1989 | Wilkinson et al. |
| 4,873,825 | A | 10/1989 | Rees |
| 5,692,372 | A | 12/1997 | Whurr |
| 6,345,952 | B1 * | 2/2002 | Oeynhausen ............. F01D 1/16 415/100 |
| 6,539,716 | B2 | 4/2003 | Finger et al. |
| 7,100,546 | B2 | 9/2006 | Sorochkin et al. |
| 7,775,044 | B2 | 8/2010 | Julien et al. |
| 8,888,449 | B2 | 11/2014 | Swenson et al. |
| 8,925,317 | B2 | 1/2015 | Rodriguez Erdmenger et al. |
| 9,021,806 | B2 | 5/2015 | Kuhlbach et al. |
| 9,194,232 | B2 | 11/2015 | Bolduc et al. |
| 9,255,478 | B2 | 2/2016 | Purdum et al. |
| 2004/0177837 | A1 | 9/2004 | Bryant |
| 2005/0229901 | A1 | 10/2005 | Weber et al. |
| 2006/0024186 | A1 | 2/2006 | Canal |
| 2007/0240415 | A1 | 10/2007 | Julien et al. |
| 2008/0169246 | A1 | 7/2008 | Japikse |
| 2009/0007882 | A1 | 1/2009 | Lents et al. |
| 2011/0088391 | A1 * | 4/2011 | Sumser ................. F01D 17/141 60/602 |
| 2011/0094221 | A1 | 4/2011 | Ge et al. |
| 2011/0197849 | A1 | 8/2011 | Wright |
| 2011/0214638 | A1 | 9/2011 | Groves |
| 2012/0227397 | A1 | 9/2012 | Willi et al. |
| 2014/0020380 | A1 | 1/2014 | Thomassin |
| 2014/0020381 | A1 * | 1/2014 | Bolduc ..................... F01C 1/22 60/605.1 |
| 2014/0208741 | A1 * | 7/2014 | Svihla ..................... F02B 37/00 60/605.1 |
| 2015/0275749 | A1 | 10/2015 | Thomassin |

FOREIGN PATENT DOCUMENTS

| | | |
|---|---|---|
| DE | 102006014934 | 10/2007 |
| EP | 1483489 | 10/2006 |
| EP | 2011962 | 1/2009 |
| EP | 2497902 | 9/2012 |
| EP | 2687675 | 1/2014 |
| EP | 2778342 | 9/2014 |
| EP | 2886828 | 10/2016 |
| EP | 2886827 | 11/2016 |
| SU | 1686202 | 10/1991 |

OTHER PUBLICATIONS

Facts about the Wright Turbo Compound, Field Engineering Department, Curtiss-Wright Corporation, Oct. 1956.

* cited by examiner

COMPOUND CYCLE ENGINE

CROSS-REFERENCE TO RELATED APPLICATION

This application is a continuation-in-part of U.S. application Ser. No. 13/554,564 filed Jul. 20, 2012, the entire contents of which are incorporated by reference herein.

TECHNICAL FIELD

The application relates generally to compound cycle engines and, more particularly, to such compound cycle engines including one or more rotary combustion engine(s).

BACKGROUND OF THE ART

Some compound cycle engines include a rotary engine turbocharged and compounded by a turbine located downstream of the turbocharger turbine. However, known compounded rotary engine arrangements typically have limited available power for turbo compounding and/or limited performances, for example on start-up before the turbocharger is running.

SUMMARY

In one aspect, there is provided a compound cycle engine comprising: an output shaft; at least two rotary units each defining an internal combustion engine including an engine rotor sealingly and rotationally received within a respective housing, each housing defining an inlet port and an exhaust port, the engine rotor of each of the at least two rotary units being in driving engagement with the output shaft; a first stage turbine including a flowpath and a turbine rotor having a circumferential array of blades extending across the flowpath, the turbine rotor of the first stage turbine being in driving engagement with the output shaft; and a turbocharger including a compressor and a second stage turbine in driving engagement with one another; wherein: an outlet of the compressor is in fluid communication with the inlet port of each housing; the exhaust port of each housing is in fluid communication with a first portion of the flowpath of the first stage turbine, the first portion of the flowpath being located upstream of the circumferential array of blades of the first stage turbine; an inlet of the second stage turbine is in fluid communication with a second portion of the flowpath of the first stage turbine, the second portion of the flowpath being located downstream of the circumferential array of blades of the first stage turbine; the first stage turbine has the output shaft extending therethrough, the least two rotary units including a first rotary unit located in front of the first stage turbine along the output shaft and a second rotary unit located behind the first stage turbine along the output shaft; and the first stage turbine has a lower reaction ratio than that of the second stage turbine.

In another aspect, there is provided a compound cycle engine comprising: a first stage turbine having a first turbine rotor drivingly engaged to an output shaft; at least two rotary engines each having an engine rotor sealingly and rotationally received within a respective housing having an inlet port and an exhaust port, the engine rotor of each of the at least two rotary engines being drivingly engaged to the output shaft, the at least two rotary engines including a first rotary engine located in front of the first stage turbine along the output shaft and a second rotary engine located behind the first stage turbine along the output shaft; a respective exhaust pipe providing fluid communication between each exhaust port and the an inlet of the first stage turbine; a turbocharger including a compressor and a second stage turbine drivingly engaged to one another; an inlet duct providing fluid communication between an outlet of the compressor and the inlet port of each of the at least two rotary engines; and a turbine pipe providing fluid communication between an outlet of the first stage turbine and an inlet of the second stage turbine; wherein the first stage turbine has a lower reaction ratio than that of the second stage turbine.

In a further aspect, there is provided a method of compounding at least two rotary engines, the method comprising: drivingly engaging a second stage turbine and a compressor in a turbocharger such as to drive the compressor with the second stage turbine; drivingly engaging each of the at least two rotary engines and a first stage turbine to an output shaft by placing the first stage turbine between two of the at least two rotary engines along the output shaft, the first stage turbine having a lower reaction ratio than that of the second stage turbine; circulating a compressor exhaust flow from an outlet of the compressor into an inlet port of each of the at least two rotary engines; circulating an engine exhaust flow from an exhaust port of each of the at least two rotary engines into an inlet of the first stage turbine; and circulating a first stage turbine exhaust flow from an outlet of the first stage turbine into an inlet of the second stage turbine of the turbocharger.

DESCRIPTION OF THE DRAWINGS

Reference is now made to the accompanying figures in which.

DETAILED DESCRIPTION

Figure 1:
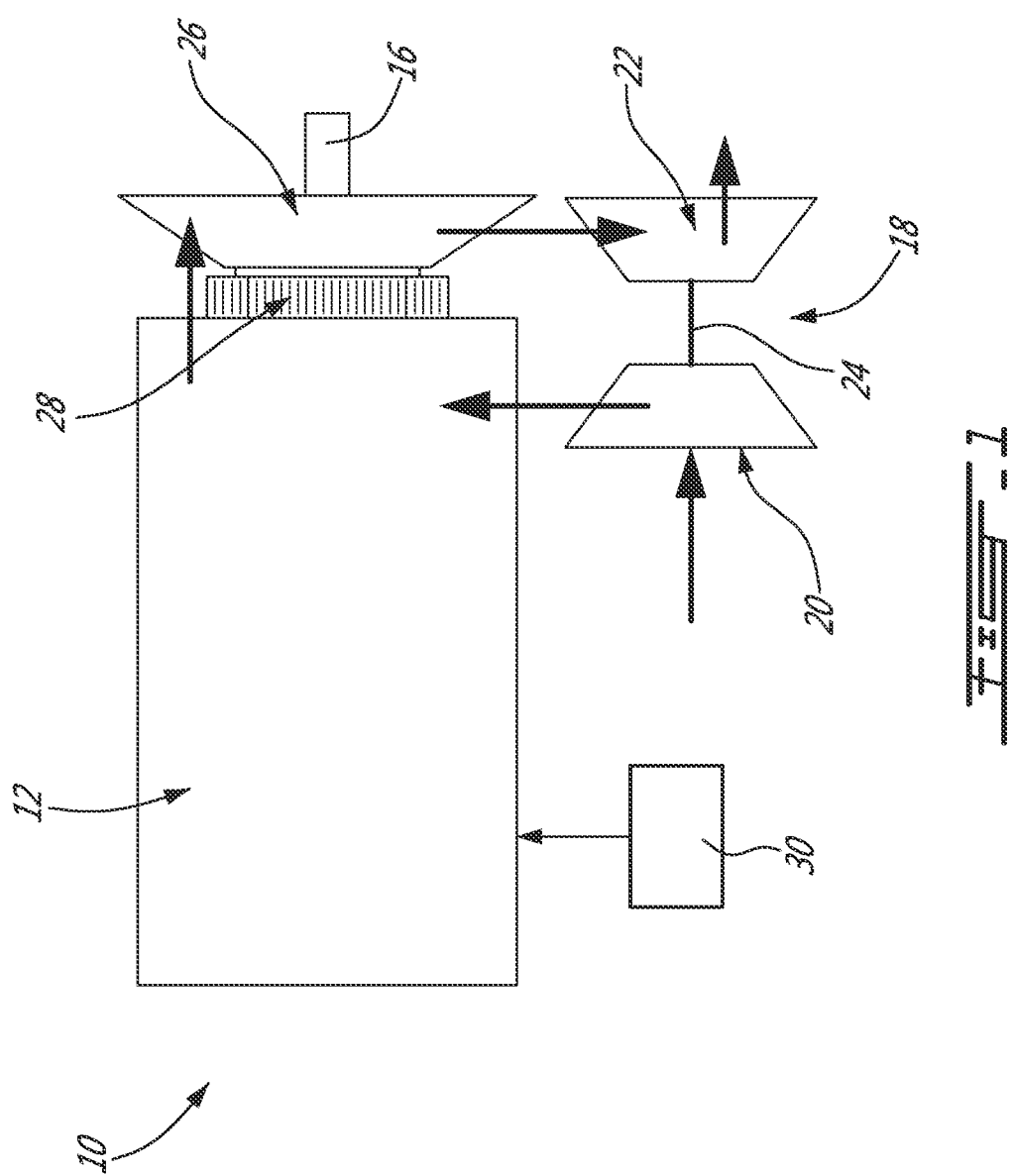
FIG. 1 is a block diagram of a compound cycle engine according to a particular embodiment.

Referring now to FIG. 1, a compound cycle engine 10 is schematically shown. The compound cycle engine 10 includes rotary units 12, each unit 12 being defined by a rotary internal combustion engine having a rotor sealingly engaged in a respective housing. The rotary units 12 drive a common load. In the embodiment shown, the common load includes an output shaft 16 which may be for example connected to a propeller through a reduction gearbox (not shown) and to which the rotor of each unit 12 is engaged.

The compound cycle engine 10 also includes a turbocharger 18, formed by a compressor 20 and a second stage turbine 22 which are drivingly interconnected by a shaft 24. In a particular embodiment, the second stage turbine 22 is a pressure turbine, also known as a reaction turbine. The compressor 20 and the second stage turbine 22 may each be a single-stage device or a multiple-stage device with a single shaft or split on multiple independent shafts in parallel or in series, and may be a centrifugal or axial device. In the embodiment shown, the shaft 24 of the turbocharger 18 rotates independently of the common load. The compressor 20 of the turbocharger 18 compresses the air before it enters the unit(s) 12.

The rotary unit(s) 12 form the core of the compound cycle engine 10 and each provide an exhaust flow in the form of exhaust pulses. The exhaust flow from the unit(s) 12 is supplied to a compound or first stage turbine 26 in fluid communication therewith, also driving the common load. The first stage turbine 26 is a velocity type turbine, also known as an impulse type turbine, and could be an axial, radial or mixed flow turbine.

A pure impulse turbine works by changing the direction of the flow without accelerating the flow inside the rotor; the fluid is deflected without a significant pressure drop in the blade passages. The blades of the pure impulse turbine are designed such that in a transverse plane perpendicular to the direction of flow, the area defined between the blades is the same at the leading edges of the blades and at the trailing edges of the blade: the flow area of the turbine is constant, and the blades are usually symmetrical about the plane of the rotating disc. The work of the pure impulse turbine is due only to the change of direction in the flow through the turbine blades. Each blade of the pure impulse turbine thus forms a bucket pushed by the exhaust flow. Typical pure impulse turbines include steam and hydraulic turbines.

In contrast, a reaction turbine accelerates the flow inside the rotor but needs a static pressure drop across the rotor to enable this flow acceleration. The blades of the reaction turbine are designed such that in a transverse plane perpendicular to the direction of flow, the area defined between the blades is larger at the leading edges of the blades than at the trailing edges of the blade: the flow area of the turbine reduces along the direction of flow, and the blades are usually not symmetrical about the plane of the rotating disc. The work of the pure reaction turbine is due mostly to the acceleration of the flow through the turbine blades.

Most aeronautical turbines are not "pure impulse" or "pure reaction", but rather operate following a mix of these two opposite but complementary principles—i.e. there is a pressure drop across the blades, there is some reduction of flow area of the turbine blades along the direction of flow, and the speed of rotation of the turbine is due to both the acceleration and the change of direction of the flow. The degree of reaction of a turbine can be determined using the temperature-based reaction ratio (equation 1) or the pressure-based reaction ratio (equation 2), which are typically close to one another in value for a same turbine:

$$\text{Reaction}(T) = \frac{(t_{S3} - t_{S5})}{(t_{S0} - t_{S5})} \quad (1)$$

$$\text{Reaction}(P) = \frac{(P_{S3} - P_{S5})}{(P_{S0} - P_{S5})} \quad (2)$$

where T is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

Aeronautical turbines referred to as impulse turbines typically have a reaction ration of 0.25 (25% reaction) or lower, although other values are also possible.

In a particular embodiment, the first stage turbine 26 is configured to take benefit of the kinetic energy of the pulsating flow exiting the core engine(s) 12 while stabilizing the flow, and the second stage turbine 22 is configured to extract energy from the remaining pressure in the flow. Accordingly, the first stage turbine 26 has a lower reaction ratio (i.e. lower value) than that of the second stage turbine 22.

The rotor of the first stage turbine 26 is rotated by the forces exerted on the blades by the impingement against them of the exhaust pulses. As such, the kinetic energy provided by each exhaust pulse is used to drive the rotor of the first stage turbine 26 while imposing minimum back pressure on the rotary unit(s) 12.

In a particular embodiment, the second stage turbine 22 has a reaction ratio higher than 0.25; in another particular embodiment, the second stage turbine 22 has a reaction ratio higher than 0.3; in another particular embodiment, the second stage turbine 22 has a reaction ratio of about 0.5; in another particular embodiment, the second stage turbine 22 has a reaction ratio higher than 0.5.

In a particular embodiment, the first stage turbine 26 has a reaction ratio of at most 0.2; in another particular embodiment, the first stage turbine 26 has a reaction ratio of at most 0.15; in another particular embodiment, the first stage turbine 26 has a reaction ratio of at most 0.1; in another particular embodiment, the first stage turbine 26 has a reaction ratio of at most 0.05.

It is understood that any of the above-mentioned reaction ratios for the second stage turbine 22 can be combined with any of the above-mentioned reaction ratios for the first stage turbine 26 and that these ratios can be pressure-based or temperature-based. Other values are also possible.

The first stage turbine 26 is connected to the output shaft 16 through an appropriate type of transmission 28, for example a planetary, star, offset or angular gear system. The outlet of the first stage turbine 26 is in fluid communication with an inlet of the second stage turbine 22. Energy is extracted from the exhaust gas exiting the first stage turbine 26 by the second stage turbine 22 to drive the compressor 20 via the connecting shaft 24.

Although not shown, the air may optionally circulate through an intercooler between the compressor 20 and the units 12, and the compound cycle engine 10 also includes a cooling system, including for example a circulation system for a coolant (e.g. water-ethylene, oil, air) to cool the housing of each unit 12, an oil coolant for the internal mechanical parts of the units 12, one or more coolant heat exchangers, etc.

The fuel injector(s) of each unit 12, which in a particular embodiment are common rail fuel injectors, communicate with a source 30 of Heavy fuel (e.g. diesel, kerosene (jet fuel), equivalent biofuel), and deliver the heavy fuel into the units 12 such that the combustion chamber is stratified with a rich fuel-air mixture near the ignition source and a leaner mixture elsewhere.

Figure 2:
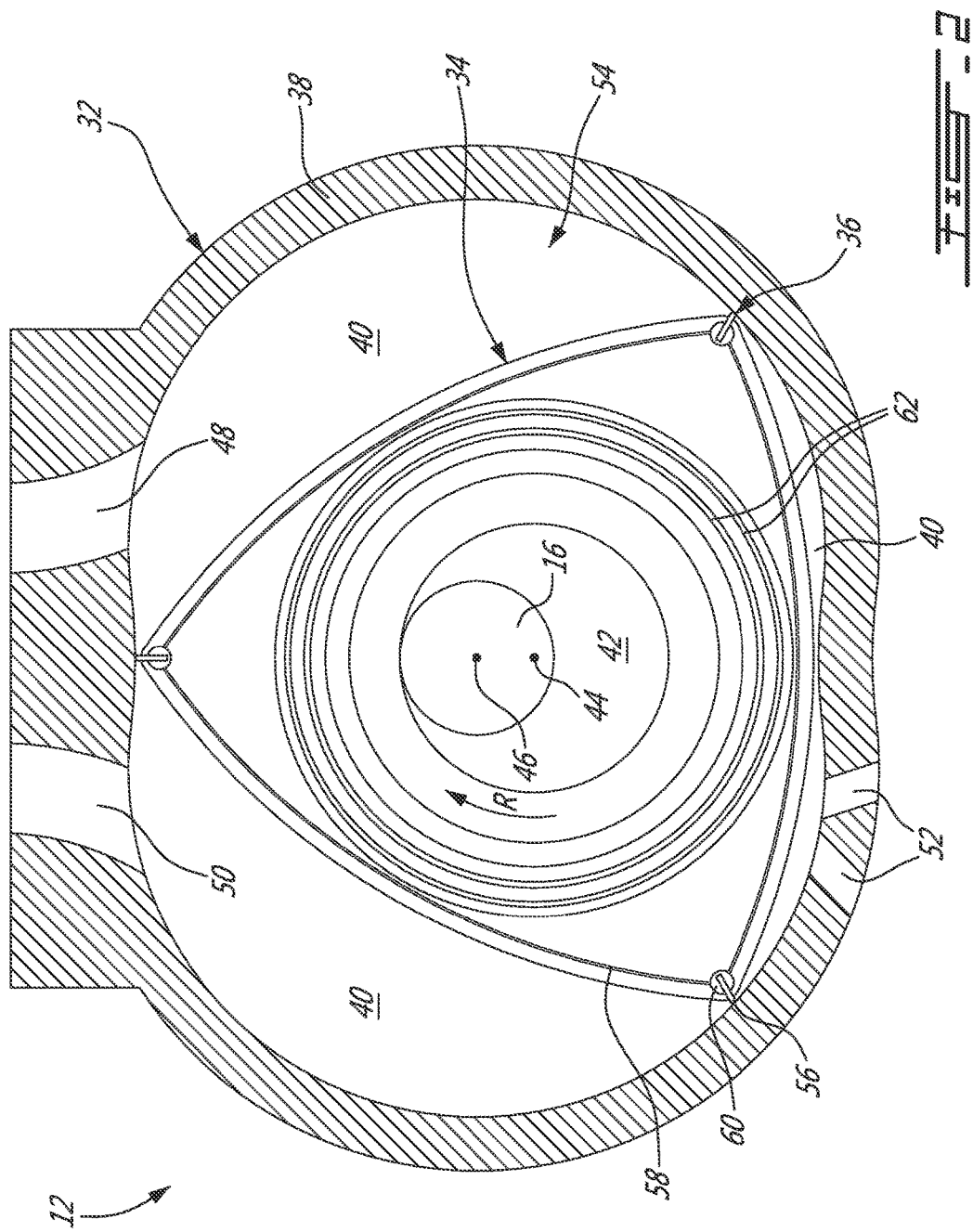
FIG. 2 is a cross-sectional view of a Wankel engine which can be used in a compound cycle engine such as shown in FIG. 1, according to a particular embodiment.

In a particular embodiment each unit 12 is a Wankel engine. Referring to FIG. 2, an exemplary embodiment of a Wankel engine is shown; it is understood that the configuration of the units 12 used in the compound cycle engine 10, e.g. placement of ports, number and placement of seals, etc., may vary from that of the embodiment shown; each unit 12 may be defined by a rotary engine other than a Wankel engine.

As shown in FIG. 2, in a particular embodiment, each unit 12 comprises a housing 32 defining a rotor cavity with a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form three working chambers 40 between the rotor 34 and the housing 32.

The rotor 34 is engaged to an eccentric portion 42 of the output shaft 16 to perform orbital revolutions within the stator cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the stator cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug or other ignition mechanism, as well as for one or more fuel injectors (not shown) are also provided through the peripheral wall 38. Alternately, the intake port 48, the exhaust port 50 and/or the passages 52 may be provided through an end or side wall 54 of the housing.

For efficient operation the working chambers 40 are sealed, for example by spring-loaded apex seals 56 extending from the rotor 34 to engage the peripheral wall 38, and spring-loaded face or gas seals 58 and end or corner seals 60 extending from the rotor 34 to engage the end walls 54. The rotor 34 also includes at least one spring-loaded oil seal ring 62 biased against the end wall 54 around the bearing for the rotor 34 on the shaft eccentric portion 42.

Each Wankel engine provides an exhaust flow in the form of a relatively long exhaust pulse; for example, in a particular embodiment, each Wankel engine has one explosion per 360° of rotation of the output shaft, with the exhaust port remaining open for about 270° of that rotation, thus providing for a pulse duty cycle of about 75%. By contrast, a piston of a reciprocating 4-stroke piston engine typically has one explosion per 720° of rotation of the output shaft with the exhaust port remaining open for about 180° of that rotation, thus providing a pulse duty cycle of 25%. In a particular embodiment, the relatively long exhaust pulse of the Wankel engine may facilitate driving of the first stage turbine 26.

The pressure ratios across a compound cycle engine with one or more rotary engines or units can be defined by:

$$P_C = P_R P_{PT} P_{TT}$$

where $P_C$ is the pressure ratio for the turbocharger compressor, $P_R$ is the inlet to outlet pressure ratio of the rotary engines, $P_{PT}$ is the pressure ratio for the compound turbine, and $P_{TT}$ is the pressure ratio for the turbocharger turbine.

The inventors have found that in prior art compound engines including one or more rotary engines where the compound turbine is a pressure turbine located downstream of the turbocharger turbine, and where each rotary engine has equal volumetric expansion and compression ratios, the relatively high volumetric compression ratio of the rotary engine(s) typically results in a relatively low possible pressure ratio for the compressor of the turbocharger ($P_C$), as limited by the peak pressure capability of the rotary engine(s). As such, the pressure ratio across the turbines ($P_{PT}P_{TT}$) is limited, which limits the power available for the compound turbine.

In some compound engines, such as shown in U.S. Pat. No. 7,775,044 issued Aug. 17, 2010 and incorporated by reference herein, the volumetric compression ratio of each rotary engine is smaller than its expansion ratio. The lower volumetric compression ratio typically results in a larger possible pressure ratio for the compressor of the turbocharger ($P_C$), which in turn increases the pressure ratio across the turbines ($P_{PT}P_{TT}$). However, the lower volumetric compression ratio usually leads to an inlet to outlet pressure ratio of the rotary engine(s) which is reduced $P_R$, which may increase back pressure and thermal loads on the rotary engine(s) because of the increased difficulty in purging the exhaust gases. Such a configuration also generally provides for a low compression on the rotary engine on start-up before the turbocharger is running, which may limit performances of the compound cycle engine.

By contrast, in at least some embodiments of the compound cycle engine 10, the pressure ratio $P_{PT}$ across the first stage turbine 26 is close to or about 1 since it is a velocity or impulse turbine. As such, a same pressure ratio for the compressor $P_C$ (to comply with the peak pressure capability) and a same inlet to outlet pressure ratio of the rotary unit(s) $P_R$ (to minimize backpressure and thermal loading on each rotary unit) allow for the pressure ratio $P_{TT}$ available for the turbine 22 of the turbocharger 18 to be greater than with a compound cycle engine in which the compound turbine is a pressure turbine, i.e. with a pressure ratio $P_{PT}$ greater than 1 and greater than that of the first stage turbine 26 of the compound cycle engine 10. Thus, the use of a velocity or impulse turbine as the first stage turbine 26 may allow for an increase of the power available to the turbo compounding.

In addition, the volumetric compression ratio of the rotary unit(s) 12 does not need to be reduced to achieve this increase in power available for the turbine 22 of the turbocharger 18. As such, in a particular embodiment, the volumetric efficiency of each rotary unit may be maximized and its thermal loads minimized, and the performances of the compound cycle engine 10 at start-up are not compromised by the increase of available power.

Also, the use of a velocity or impulse turbine as the first stage turbine 26 eliminates the need for the large volume exhaust collector typically required between the rotary engine(s) and a pressure first stage turbine. This allows for the compound turbine 26 to be located upstream of the turbocharger turbine 22 instead of downstream thereof.

In a particular embodiment which may be particularly but not exclusively suitable for low altitude, each rotary unit 12 is a Wankel engine with a volumetric compression ratio of from 6:1 to 8:1. The power recovery of the first stage turbine 26 may be maximized by having the exhaust gas temperatures at the material limit, and as such is suitable for such relatively low volumetric compression ratios, which may help increase the power density of the Wankel engine and may also improve combustion at high speed and of heavy fuel.

Figure 3:
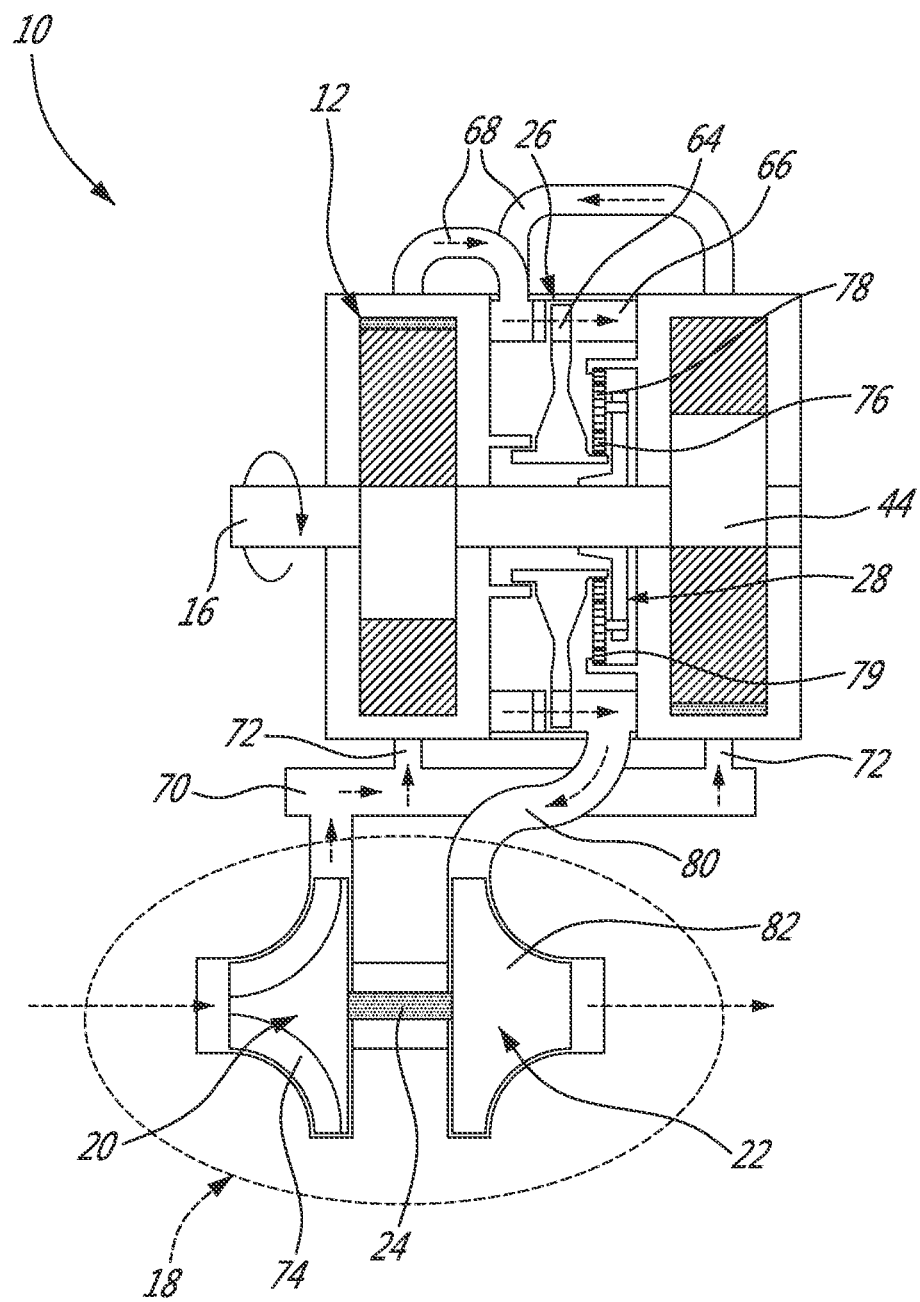
FIG. 3 is a schematic representation of the compound cycle engine of FIG. 1 according to a particular embodiment.
Figure 4:
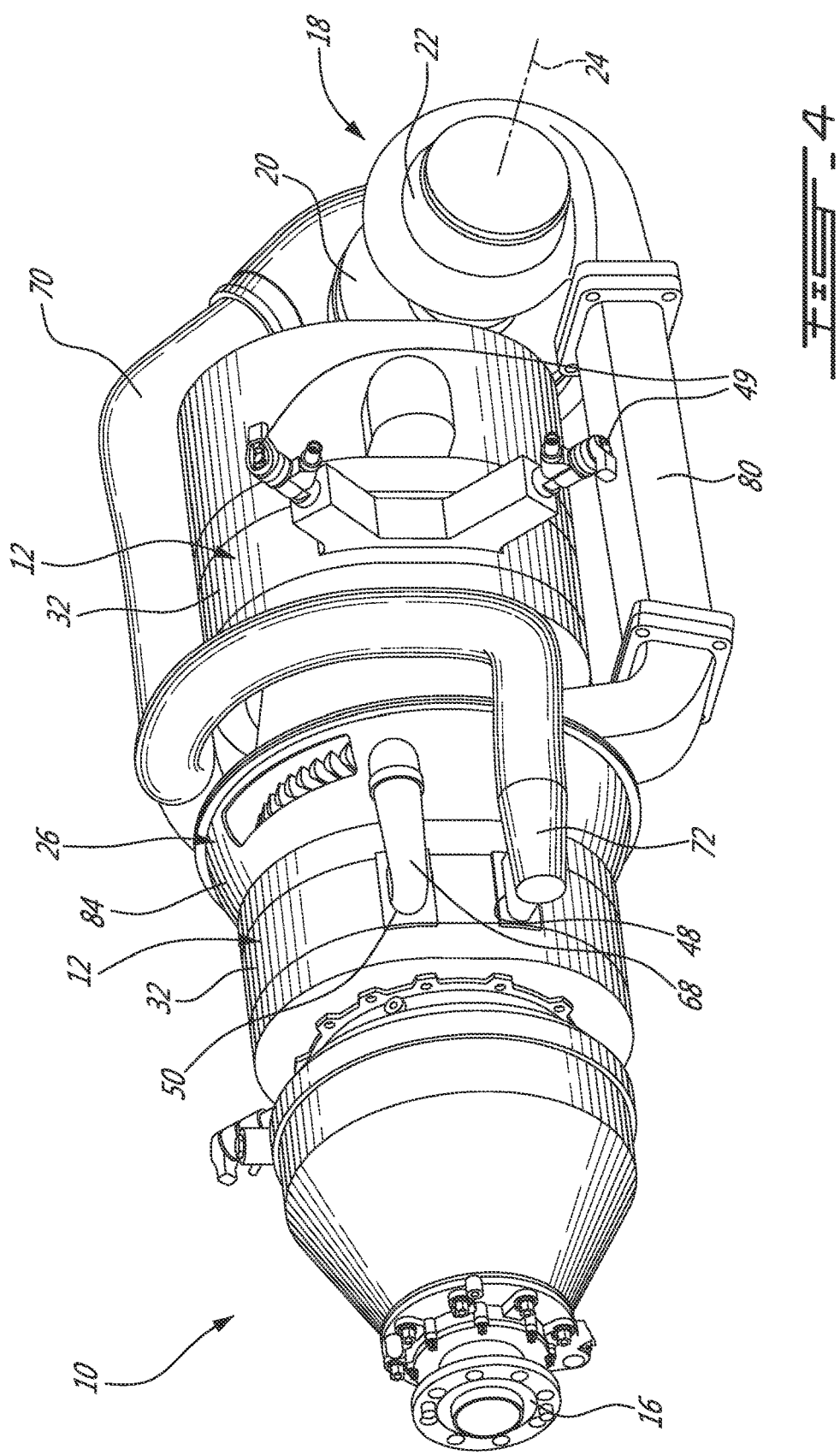
FIG. 4 is a schematic tridimensional view of a compound cycle engine such as shown in FIG. 3 according to a particular embodiment.

Referring to FIGS. 3-4, a compound cycle engine 10 according to a particular embodiment is schematically shown. In this embodiment, two rotary units 12 in the form of Wankel engines are included, with the two eccentric portions 42 of the output shaft 16 being angularly offset at 180° from one another for balancing of the compound cycle engine 10.

The rotor blades 64 of the first stage turbine 26 extend across an annular flowpath 66. In the embodiment shown, the rotor of the first stage turbine 26 is an axial rotor and the flowpath 66 extends axially. A respective exhaust pipe 68 extends from the exhaust port 50 (see also FIG. 2) of each unit 12 to a portion of the flowpath 66 located upstream of the rotor blades 64 as shown in FIG. 3, such as to circulate the exhaust flow from the exhaust port 50 to the first stage turbine 26. The exhaust pipes 68 extend independently from one another.

In order to minimize the distance between the first stage turbine 26 and each rotary unit 12 and as such the length of the exhaust pipes 68, the first stage turbine 26 and its transmission 28 are located between the two rotary units 12 along the output shaft 16. In the embodiment shown and referring more particularly to FIG. 3, the output shaft 16, for example made of two interconnected pieces, extends through the first stage turbine 26 and the rotary units 12, with the eccentric portions 42 extending from the remainder of the output shaft 16, either as an integral piece thereof or as separately manufactured elements attached thereto.

In a particular embodiment and as shown in FIG. 4, the casing 84 surrounding the first stage turbine 26 is directly attached to the housing 32 of each rotary unit 12. Such a configuration may allow for relatively short exhaust pipes 68, thus helping minimize loss of the kinetic energy of the exhaust pulses between each rotary unit 12 and the first stage turbine 26. Fuel injectors 49, which may be common rail fuel injectors, communicate with each unit 12.

The flowpath 66 and/or the outlet of each exhaust pipe 68 are shaped to direct the exhaust pulses onto the blades 64 to allow the exhaust pulses to drive rotation of the rotor of the first stage turbine 26. Each exhaust pipe 68 communicates with the flowpath 66 at a different location around the circumference of the first stage turbine 26. In the embodiment shown, the housings 32 of the rotary units 12 are angularly offset at 180° from one another, for example to allow for a reduction in thermal deflection of the housings 32. As such, the two exhaust ports 50 and exhaust pipes 68 are located on opposite sides of the compound cycle engine 10. In a particular embodiment, each exhaust pipe 68 extends axially or substantially axially to further minimize its length.

Still referring to FIGS. 3-4, a pipe 70 extends from an outlet of the compressor 20, and splits into two inlet pipes 72, each connected to the intake port 48 (see also FIG. 2) of the rotary unit 12, such as to circulate the exhaust flow from the compressor 20 to each intake port 48. In this embodiment, the compressor 20 includes a single radial impeller 74. Alternately, the compressor 20 may include one or more rotors, with radial, axial or mixed flow blades.

In the embodiment shown, the transmission 28 of the first stage turbine 26 includes a sun gear 76 attached on the shaft of the rotor of the first stage turbine 26, and an array of planet gears 78 meshed with the sun gear 76. The planet gears 78 are mounted on a rotating carrier which is drivingly engaged to the output shaft 16. The planet gears 78 are meshed with a stationary ring gear 79. In another embodiment, the planet gears 78 are mounted on a stationary carrier, and are meshed with a ring gear drivingly engaged to the output shaft 16. The speed reduction ratio of the transmission 28 may be selected to optimize operation of the first stage turbine 26 and of the rotary units 12.

A turbine pipe 80 extends from a portion of the flowpath 66 downstream of the rotor blades 64 (as shown in FIG. 3) to the inlet of the second stage turbine 22, such as to circulate the exhaust flow from the first stage turbine 26 to the second stage turbine 22. In this embodiment, the second stage turbine 22 includes a single radial impeller 82. Alternately, the second stage turbine 22 may include one or more rotors, with radial, axial or mixed flow blades.

In the embodiment shown, the turbocharger shaft 24 extends along a different axis than that of the output shaft 16. In the particular embodiment shown in FIG. 4, the turbocharger shaft 24 extends transverse to the output shaft 16. The turbocharger shaft 24 may additionally be connected to a different load than that of the output shaft 16, through a gearbox if necessary.

Figure 5:
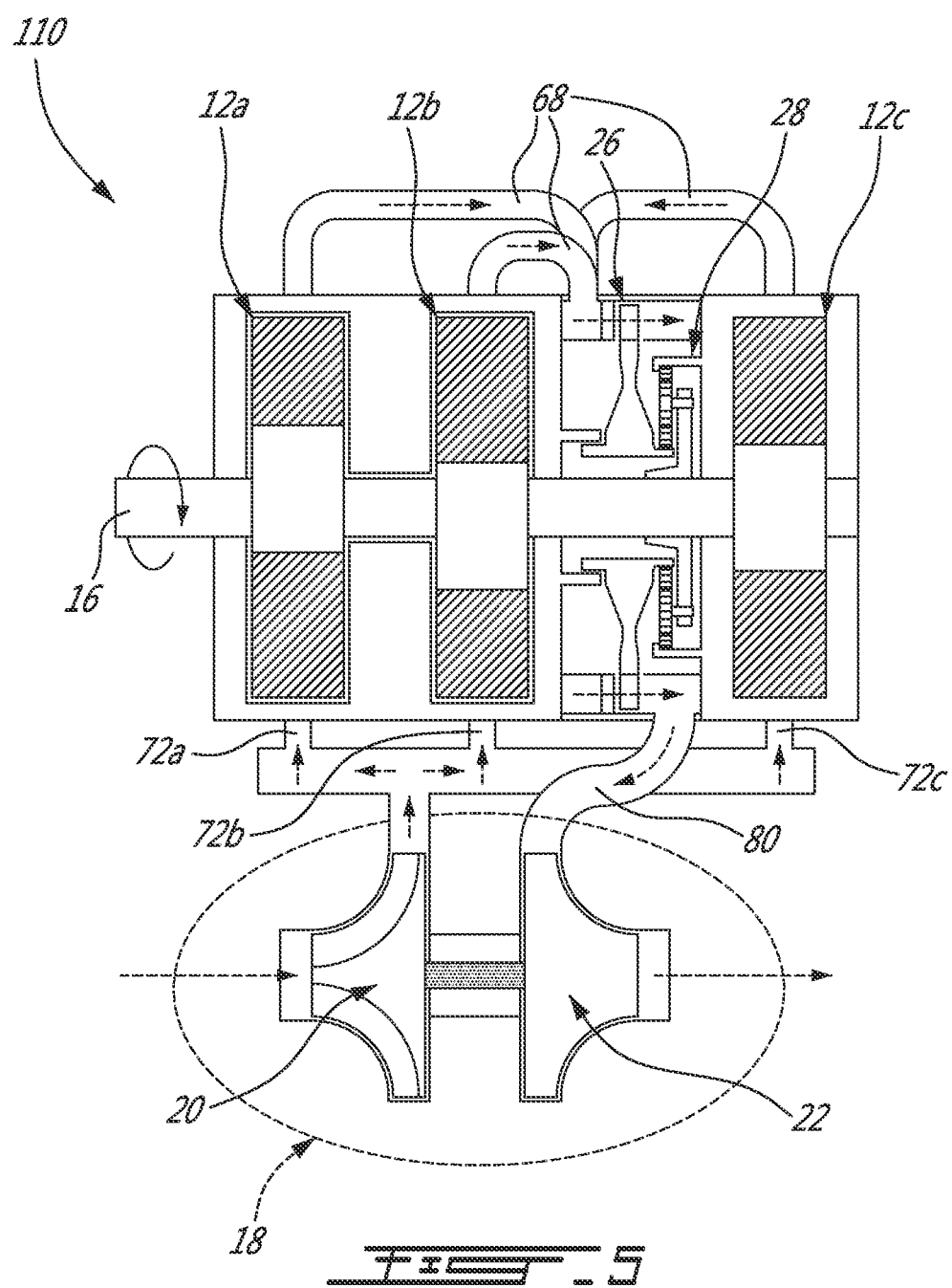
FIG. 5 is a schematic representation of the compound cycle engine of FIG. 1 according to another embodiment.
Figure 6:
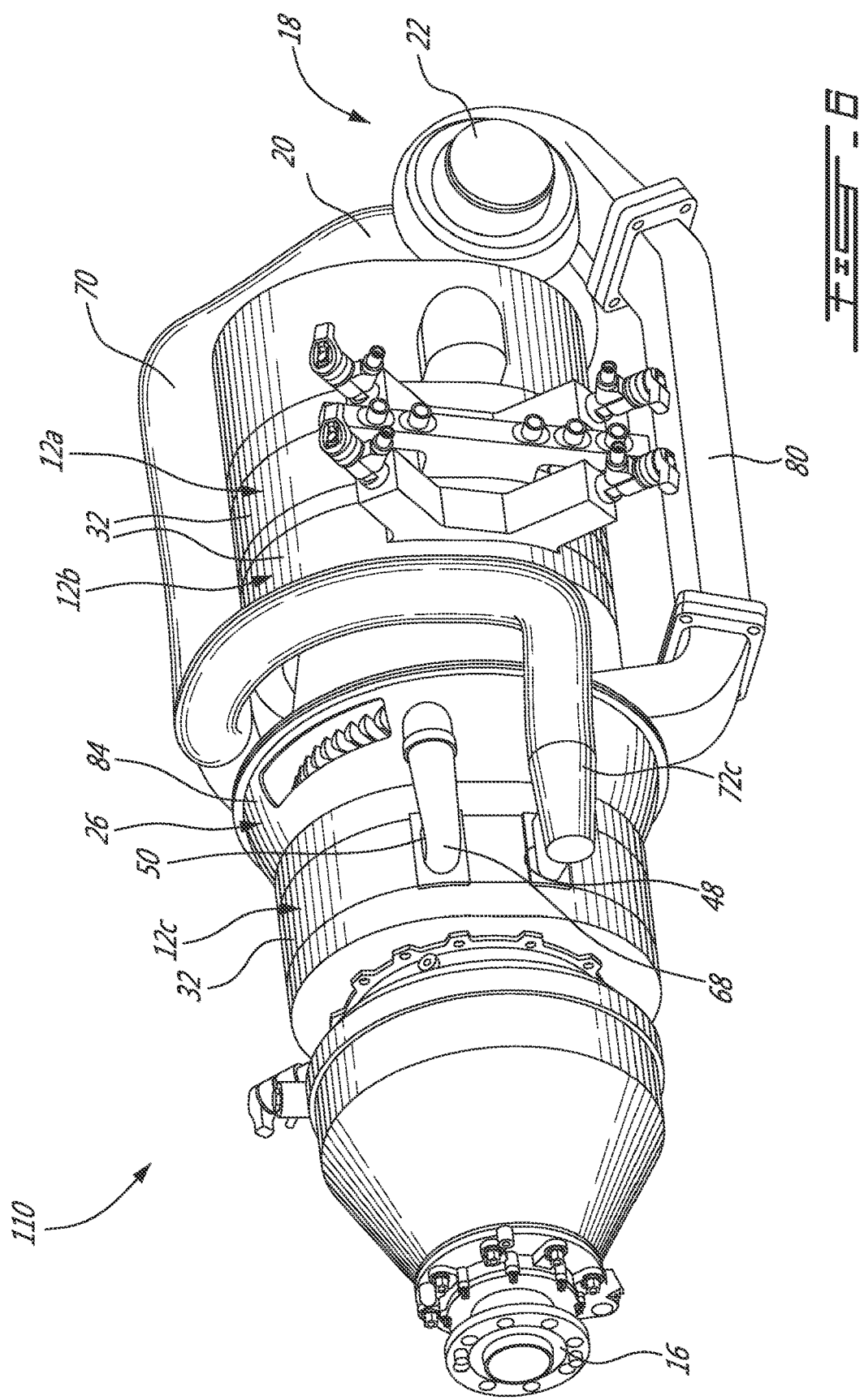
FIG. 6 is a schematic tridimensional view of a compound cycle engine such as shown in FIG. 5 according to a particular embodiment.

Referring to FIGS. 5-6, a compound cycle engine 110 according to another embodiment is schematically shown, where elements similar to those of the previously described compound cycle engine 10 are identified by the same reference numerals and will not be further described therein.

In this embodiment, three rotary units 12a,b,c, for example Wankel engines such as shown in FIG. 2, are provided. The first stage turbine 26 and its transmission 28 are located between two of the units 12, i.e. two units 12a,b are provided in front of the first stage turbine 26 and the transmission 28 and the other unit 12c is provided behind the first stage turbine 26 and the transmission 28 along the output shaft 16 (FIG. 5), or two units 12a,b are provided behind the first stage turbine 26 and the transmission 28, and the other unit 12c is provided in front of the first stage turbine 26 and the transmission 28 along the output shaft 16 (FIG. 6). In the embodiment shown, the eccentric portions 42 of the output shaft 16 are angularly offset at 120° from one another for balancing of the compound cycle engine 10.

Each exhaust pipe 68 independently extends from the exhaust port 50 of its respective unit 12a,b,c to the flowpath 66, upstream of the rotor blades 64. In the embodiment shown in FIG. 6, the housings 32 of the two adjacent units 12a,b have a same orientation, i.e. with the exhaust ports 50 and exhaust pipes 68 located on a same side of the compound cycle engine 110, and the remaining unit 12c has its housing 32 disposed at 180° from the others, with the exhaust port 50 and exhaust pipe 68 located on the opposite side of the compound cycle engine 110. Each exhaust pipe 68 communicates with the flowpath 66 at a different location around the circumference of the first stage turbine 26.

The pipe 70 extending from the outlet of the compressor 20 splits into three inlet pipes 72a,b,c, each connected to the intake port 48 of the respective rotary units 12a,b,c. The inlet pipes 72a,b on a same side of the body of the compound cycle engine 110 share a common portion before separating into the individual pipes 72a,b near the inlets 48.

Figure 7:
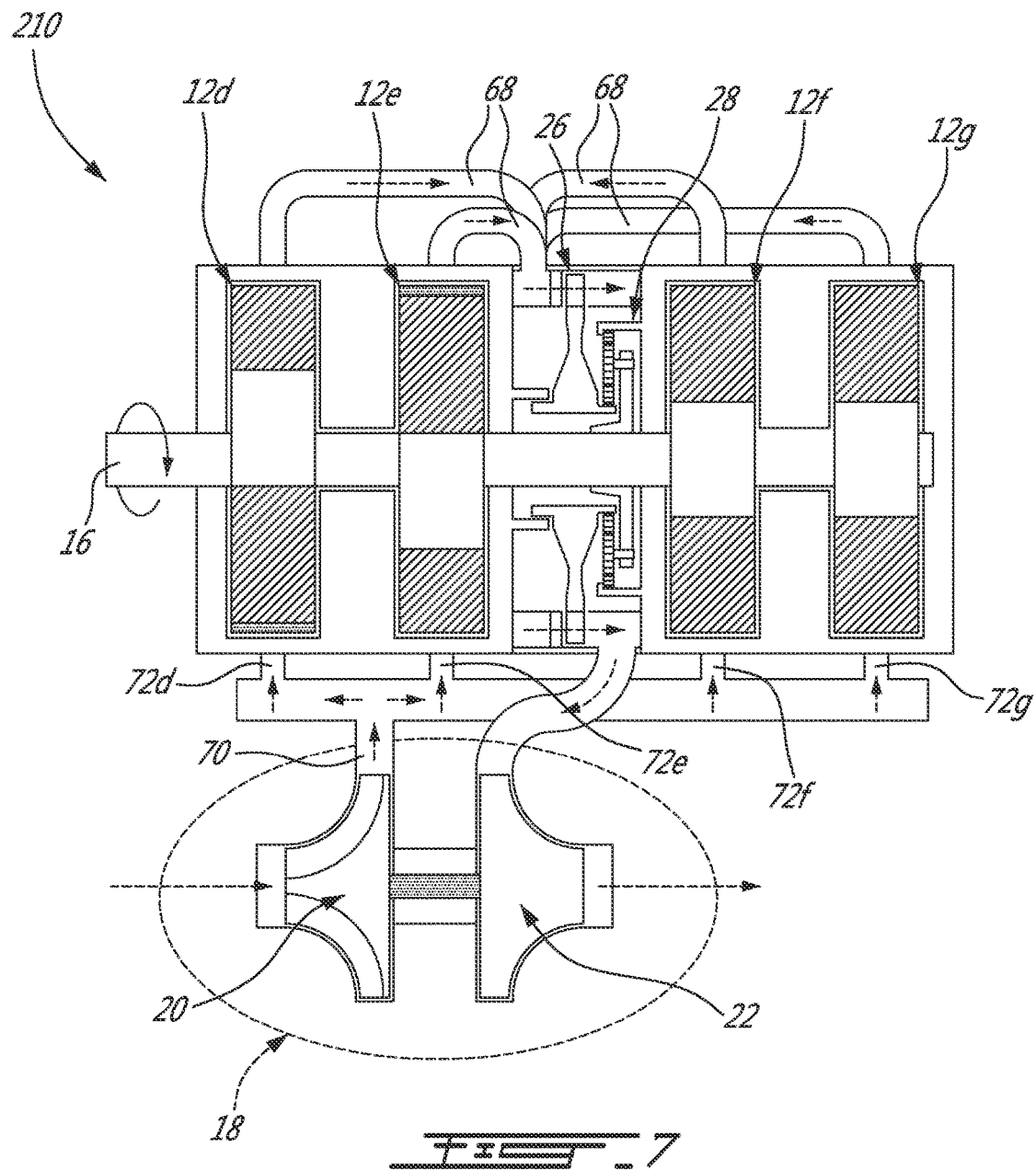
FIG. 7 is a schematic representation of the compound cycle engine of FIG. 1 according to yet another embodiment.
Figure 8:
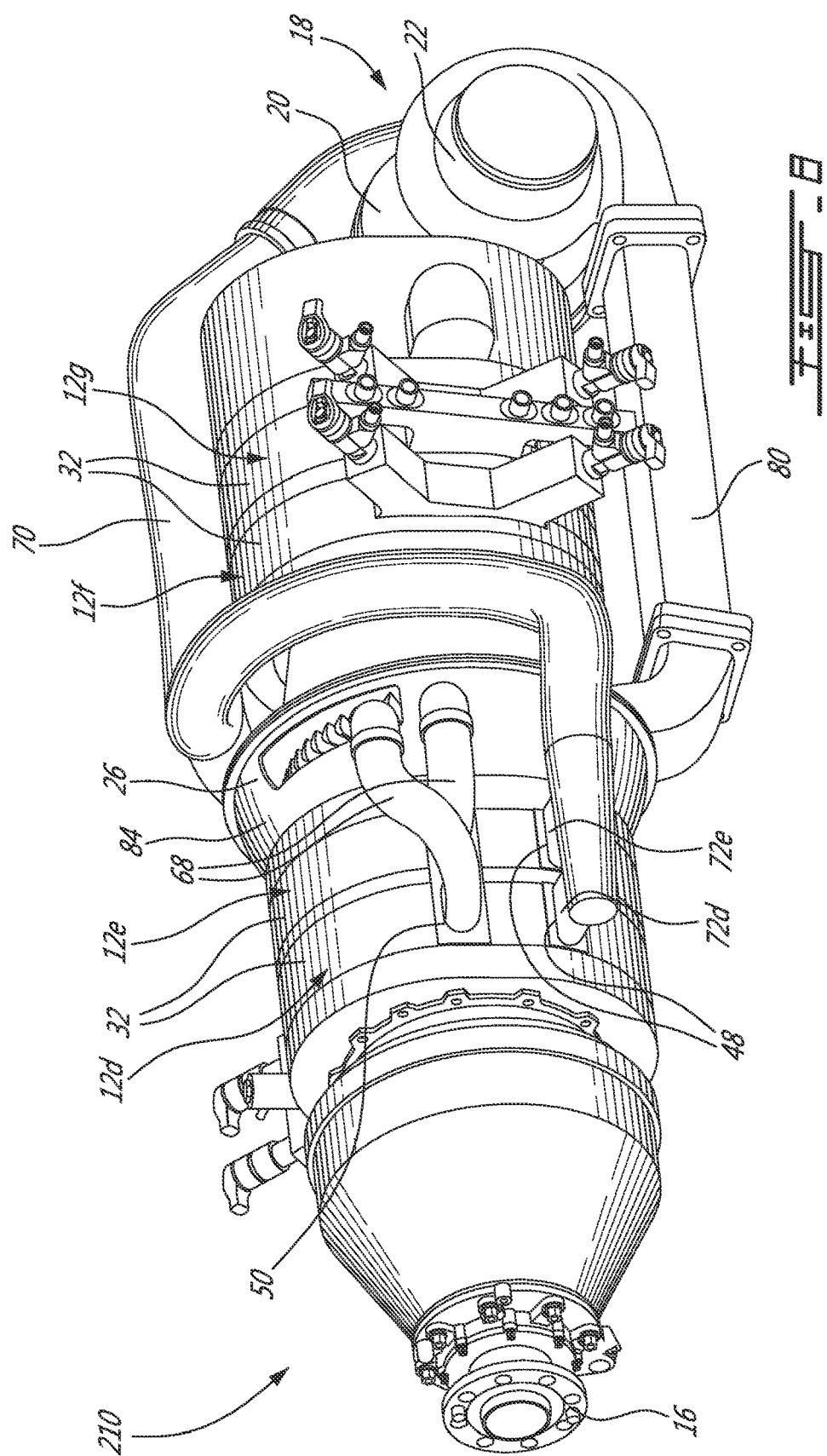
FIG. 8 is a schematic tridimensional view of a compound cycle engine such as shown in FIG. 7 according to a particular embodiment.

Referring to FIGS. 7-8, a compound cycle engine 210 according to another embodiment is schematically shown, where elements similar to those of the previously described compound cycle engines 10, 110 are identified by the same reference numerals and will not be further described herein.

In this embodiment, four rotary units 12d,e,f,g, for example Wankel engines such as shown in FIG. 2, are provided. The first stage turbine 26 and its transmission 28 are located between two blocks of two of the units 12, i.e. two units 12d,e are located in front of the first stage turbine 26 and the transmission 28, and the other two units 12f,g are located behind the first stage turbine 26 and the transmission 28 along the output shaft 16. In the embodiment shown, the eccentric portions 42 of the output shaft 16 are angularly offset at 90° from one another for balancing of the compound cycle engine 10.

Each exhaust pipe 68 independently extends from the exhaust port 50 of its respective unit 12d,e,f,g to the flowpath 66, upstream of the rotor blades 64. The exhaust pipes 68 extend axially or substantially axially to help minimize their length. In the embodiment shown in FIG. 8, the housings 32 of the first block of adjacent units 12d,e have a same orientation with the exhaust ports 50 and exhaust pipes 68 located on a same side of the compound cycle engine 110. The housing 32 of the second block of adjacent units 12f,g are oriented at 180° with respect to the first block, with the exhaust ports 50 and exhaust pipes 68 located on the opposite side of the compound cycle engine 110. Each exhaust pipe 68 communicates with the flowpath 66 at a different location around the circumference of the first stage turbine 26.

The pipe 70 extending from the outlet of the compressor 20 splits into four inlet pipes 72d,e,f,g, each connected to the intake port 48 of the respective unit 12d,e,f,g. The inlet pipes 72d,e and 72f,g connecting to adjacent inlets 48 share a common portion before separating into the individual pipes near the inlets 48.

In other embodiments which is not shown, the turbocharger 18 also drives the output shaft 16, for example by having the pressure turbine 22 of the turbocharger 18 directly engaged to the first stage turbine 26, or engaged to the output shaft 16 through a respective transmission. In other embodiments which are not shown, the turbocharger and rotary units(s) are coaxial, but the output shaft and turbocharger shaft rotate independently from one another, for example with the output shaft being hollow and surrounding the turbocharger shaft which extends therethrough.

Although embodiments with 2, 3 and 4 rotary units have been shown, in other embodiments, more than 4 rotary units may be provided. In a particular embodiment, the rotary units are disposed such as to have a same number of rotary units in front and behind the first stage turbine along the output shaft, for an even number of rotary units, or a number of rotary units in front of the first stage turbine which is one more or one less than the number of rotary units behind the first stage turbine along the output shaft, for an odd number of rotary units. Such a disposition may allow for the length of the exhaust pipes 68 to be minimized and as such may help minimize power loss between the rotary units and the first stage turbine.

Although not shown, in all embodiments, variable geometry elements such as inlet guide vanes, blow-off valves, waste gates, variable turbine nozzles, etc. may be used to obtain desired system operability.

Although not shown, the first stage turbine 26 may be mounted in an offset manner rather than co-axially with the rotary units 12. The first stage turbine 26 may be drivingly engaged to the output shaft through an angular, for example perpendicular, transmission system, for example including a gearbox and a tower shaft.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A compound cycle engine comprising:
an output shaft;
at least two rotary units each defining an internal combustion engine including an engine rotor sealingly and rotationally received within a respective housing, each housing defining an inlet port and an exhaust port, the engine rotor of each of the at least two rotary units being in driving engagement with the output shaft;
a first stage turbine including a flowpath and a turbine rotor having a circumferential array of blades extending across the flowpath, the turbine rotor being in driving engagement with the output shaft; and
a turbocharger including a compressor and a second stage turbine in driving engagement with one another;
wherein:
an outlet of the compressor is in fluid communication with the inlet port of each housing;
the exhaust port of each housing is in fluid communication with a first portion of the flowpath of the first stage turbine, the first portion of the flowpath being located upstream of the circumferential array of blades of the first stage turbine;
an inlet of the second stage turbine is in fluid communication with a second portion of the flowpath of the first stage turbine, the second portion of the flowpath being located downstream of the circumferential array of blades of the first stage turbine;
the first stage turbine has the output shaft extending therethrough, the least two rotary units including a first rotary unit located in front of the first stage turbine along the output shaft and a second rotary unit located behind the first stage turbine along the output shaft; and
the first stage turbine has a lower reaction ratio than that of the second stage turbine.

2. The compound cycle engine as defined in claim 1, wherein the reaction ratio of the first stage turbine is a pressure-based reaction ratio having a value of at most 0.25.

3. The compound cycle engine as defined in claim 1, wherein the reaction ratio of the first stage turbine is a pressure-based reaction ratio having a value of at most 0.1 and the second stage turbine has a pressure-based reaction ratio having a value of at least 0.25.

4. The compound cycle engine as defined in claim 1, wherein the reaction ratio of the first stage turbine is a pressure-based reaction ratio having a value of at most 040.2 and the second stage turbine has a pressure-based reaction ratio having a value of at least 0.25.

5. The compound cycle engine as defined in claim 1, wherein each of the at least two rotary units is a Wankel engine.

6. The compound cycle engine as defined in claim 1, wherein the compressor and the second stage turbine are in driving engagement with one another through a turbocharger shaft rotatable independently of the output shaft.

7. The compound cycle engine as defined in claim 6, wherein the turbocharger shaft and the output shaft extend in a non-parallel manner.

8. The compound cycle engine as defined in claim 1, further comprising common rail fuel injectors for each of the at least two rotary units, and a heavy fuel source in communication with the fuel injectors.

9. The compound cycle engine as defined in claim 1, wherein the at least two rotary units include the first rotary unit, the second rotary unit, and additional rotary units, the additional rotary units being located such that a same number of the rotary units is disposed in front of and behind the first stage turbine along the output shaft.

10. The compound cycle engine as defined in claim 1, wherein the at least two rotary units include the first rotary unit, the second rotary unit, and additional rotary units, the additional rotary units being located such that a number of the rotary units disposed in front of the first stage turbine is one more or one less than a number of the rotary units disposed behind the first stage turbine along the output shaft.

11. A compound cycle engine comprising:
   a first stage turbine having a first turbine rotor drivingly engaged to an output shaft;
   at least two rotary engines each having an engine rotor sealingly and rotationally received within a respective housing having an inlet port and an exhaust port, the engine rotor of each of the at least two rotary engines being drivingly engaged to the output shaft, the at least two rotary engines including a first rotary engine located in front of the first stage turbine along the output shaft and a second rotary engine located behind the first stage turbine along the output shaft;
   a respective exhaust pipe providing fluid communication between each exhaust port and an inlet of the first stage turbine;
   a turbocharger including a compressor and a second stage turbine drivingly engaged to one another;
   an inlet duct providing fluid communication between an outlet of the compressor and the inlet port of each of the at least two rotary engines; and
   a turbine pipe providing fluid communication between an outlet of the first stage turbine and an inlet of the second stage turbine;
   wherein the first stage turbine has a lower reaction ratio than that of the second stage turbine.

12. The compound cycle engine as defined in claim 11, wherein the reaction ratio of the first stage turbine is a pressure-based reaction ratio having a value of at most 0.25.

13. The compound cycle engine as defined in claim 11, wherein the reaction ratio of the first stage turbine is a pressure-based reaction ratio having a value of at most 0.1 and the second stage turbine has a pressure-based reaction ratio having a value of at least 0.25.

14. The compound cycle engine as defined in claim 11, wherein the reaction ratio of the first stage turbine is a pressure-based reaction ratio having a value of at most 0.2 and the second stage turbine has a pressure-based reaction ratio having a value of at least 0.25.

15. The compound cycle engine as defined in claim 11, wherein each exhaust pipe extends axially.

16. The compound cycle engine as defined in claim 11, wherein each of the at least two rotary engines is a Wankel engine.

17. The compound cycle engine as defined in claim 11, wherein the first stage turbine has the output shaft extending therethrough and is in driving engagement with the output shaft through a transmission, the transmission being located between the first and second rotary engines.

18. The compound cycle engine as defined in claim 11, further comprising common rail fuel injectors for each of the at least two rotary engines, and a heavy fuel source in communication with the fuel injectors.

19. The compound cycle engine as defined in claim 11, wherein the at least two rotary engines are located such that a same number of the at least two rotary engines is disposed in front of and behind the first stage turbine along the output shaft.

20. The compound cycle engine as defined in claim 11, wherein the at least two rotary engines are located such that a number of the at least two rotary engines disposed in front of the first stage turbine is one more or one less than a number of the at least two rotary engines disposed behind the first stage turbine along the output shaft.

21. A method of compounding at least two rotary engines, the method comprising:
   drivingly engaging a second stage turbine and a compressor in a turbocharger such as to drive the compressor with the second stage turbine;
   drivingly engaging each of the at least two rotary engines and a first stage turbine to an output shaft by placing the first stage turbine between two of the at least two rotary engines along the output shaft, the first stage turbine having a lower reaction ratio than that of the second stage turbine;
   circulating a compressor exhaust flow from an outlet of the compressor into an inlet port of each of the at least two rotary engines;
   circulating an engine exhaust flow from an exhaust port of each of the at least two rotary engines into an inlet of the first stage turbine; and
   circulating a first stage turbine exhaust flow from an outlet of the first stage turbine into an inlet of the second stage turbine of the turbocharger.

22. The method as defined in claim 21, further comprising providing fluid communication between a source of heavy fuel and each of the at least two rotary engines.

* * * * *